(12) United States Patent
Schalla

(10) Patent No.: US 10,577,063 B2
(45) Date of Patent: Mar. 3, 2020

(54) STOWAGE CONTAINER WITH BREACH DETECTION AND INDICATION SYSTEM

(71) Applicant: The Boeing Company, Chicago, IL (US)

(72) Inventor: James Schalla, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/701,997

(22) Filed: Sep. 12, 2017

(65) Prior Publication Data

US 2019/0077491 A1    Mar. 14, 2019

(51) Int. Cl.
| | |
|---|---|
| B65D 77/20 | (2006.01) |
| B63C 9/23 | (2006.01) |
| B64D 11/06 | (2006.01) |
| B60R 11/00 | (2006.01) |
| B60R 7/04 | (2006.01) |

(52) U.S. Cl.
CPC ............ B63C 9/23 (2013.01); B64D 11/0631 (2014.12); B65D 77/20 (2013.01); *B60R 7/043* (2013.01); *B60R 2011/0012* (2013.01); *B60R 2011/0052* (2013.01); *B60R 2011/0094* (2013.01)

(58) Field of Classification Search
CPC ............ B60R 7/043; B60R 2011/0012; B60R 2011/0052; B60R 2011/0094; B63C 9/22; B63C 9/23; B64D 11/06; B64D 11/0631; B64D 13/00; B64D 25/04; B65D 55/02; B65D 77/02; B65D 77/20

USPC ............ 116/307, 321–326; 206/459.1, 807; 244/118.6; 296/37.15; 297/188.08, 297/188.13

See application file for complete search history.

(56) References Cited

U.S. PATENT DOCUMENTS

| | | | |
|---|---|---|---|
| 3,623,683 A | 11/1971 | Bennett | |
| 4,462,501 A * | 7/1984 | Franchi | B65D 50/069 206/807 |

(Continued)

FOREIGN PATENT DOCUMENTS

| | | |
|---|---|---|
| GB | 2546086 A | 7/2017 |
| WO | 2015-189721 A2 | 12/2015 |

OTHER PUBLICATIONS

Specification and Drawings in copending U.S. Appl. No. 15/702,057, 32 pages.

(Continued)

*Primary Examiner* — Bryon P Gehman
(74) *Attorney, Agent, or Firm* — MH2 Technology Law Group LLP

(57) ABSTRACT

A stowage container including a barrier such as a door or access panel and a breach detector for monitoring and/or detecting a breach of the barrier. The breach detector includes an indicator assembly having a slot that can be positioned between, and defined by, a front panel and a back panel of the barrier, and an indicator within the slot. The indicator assembly further includes a retainer that maintains the indicator in a first state when the barrier is in a first position (e.g., closed or sealed) and which releases the indicator into a second state when the barrier moves from the first position to a second position (e.g., open or breached). Upon returning the barrier to the first position, the indicator remains in the second state until the indicator reset to the first state.

19 Claims, 16 Drawing Sheets

(56) References Cited

U.S. PATENT DOCUMENTS

| | | | |
|---|---|---|---|
| 4,535,903 A * | 8/1985 | Franchi | B65D 50/069 |
| | | | 206/807 |
| 4,585,123 A * | 4/1986 | Penry | G11B 33/10 |
| | | | 206/459.1 |
| 4,674,641 A | 6/1987 | Rusinyak | |
| 4,807,271 A * | 2/1989 | Covington | G03B 42/04 |
| | | | 206/459.1 |
| 5,096,249 A | 3/1992 | Hines | |
| 6,902,453 B2 * | 6/2005 | Switlik | B63C 9/22 |
| | | | 383/205 |
| 6,960,110 B2 | 11/2005 | Hough | |
| 7,178,867 B2 | 2/2007 | Hough | |
| 7,252,569 B2 | 8/2007 | Everhart et al. | |
| 7,913,870 B2 | 3/2011 | Vovan | |
| 7,976,101 B2 * | 7/2011 | Wieland | B64D 11/0629 |
| | | | 297/188.08 |
| 8,292,223 B2 * | 10/2012 | Lamoree | B64D 11/06 |
| | | | 244/118.6 |
| 8,678,493 B2 | 3/2014 | Lamoree et al. | |
| 10,144,515 B2 * | 12/2018 | Le | B60R 7/043 |
| 2003/0215162 A1 | 11/2003 | Switlik et al. | |
| 2008/0106127 A1 | 5/2008 | Hough et al. | |
| 2010/0012542 A1 * | 1/2010 | Methuen | A45C 13/00 |
| | | | 206/459.1 |
| 2013/0271299 A1 | 10/2013 | Lamoree et al. | |
| 2015/0034641 A1 | 2/2015 | Aruga | |
| 2015/0038030 A1 | 2/2015 | White | |
| 2017/0225790 A1 * | 8/2017 | Ball | B64D 11/0631 |
| 2019/0077491 A1 | 3/2019 | Schalla | |
| 2019/0077559 A1 | 3/2019 | Lumsden et al. | |
| 2019/0152401 A1 * | 5/2019 | Gargano | B60R 7/043 |

OTHER PUBLICATIONS

Cuiper, Ralf (EP Examiner), Extended European Search Report dated Feb. 12, 2019 in corresponding EP Application No. 18184405.1, 7 pages.

* cited by examiner

STOWAGE CONTAINER WITH BREACH DETECTION AND INDICATION SYSTEM

TECHNICAL FIELD

The present teachings relate to the field of aircraft emergency devices and, more particularly, to a stowage container including a breach detector that can be used, for example, to store an article such as a life vest under an aircraft seat.

BACKGROUND

Under United States federal regulations, no person may operate an airplane in any overwater operation unless it is equipped with a device such as a life preserver or flotation (hereinafter, "life vest") for each occupant. The life vest must be within easy reach of each seated occupant and readily removable from the airplane. In passenger aircraft, this requirement is typically satisfied by storing a life vest underneath each seat.

Each life vest can be stored within an under-seat stowage container. Once the life vest is placed within the stowage container, a door of the stowage container can be closed and fitted with a frangible closure or seal to ensure that the stowage container contents have not been tapered with or removed, or that any foreign object or material has been placed within the stowage container. While the frangible closure should be sufficient to easily identify a stowage container that has been breached, it must allow easy entry into the stowage container to access the contents of the stowage container in case of emergency, but should not be replaceable by unauthorized personnel. Each frangible closure is periodically inspected by authorized aviation personnel to ensure that the stowage container has not been breached. Typically, an inspector checks each closure individually which can involve visual inspection as well as manual contact with the closure to ensure that it has not been removed and replaced. Once the frangible closure has been removed, it must be replaced with an unused seal.

A stowage container closure that allows for a more rapid and simplified inspection to detect a stowage container breach would be a welcome addition to the art. Further, a closure that mitigated the need to maintain a supply of replacement closures would be desirable.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation, a container assembly includes a barrier defining a slot and further defining a window that opens to the slot, a frame, wherein the barrier is movably attached to the frame such that the barrier moves between a first position and a second position, and an indicator slidably positioned within the slot. The container assembly further includes a retainer attached to the frame, wherein the retainer is configured to maintain the indicator in a first state within the slot when the barrier is in the first position. The retainer is further configured to release the indicator into a second state when the indicator is in the first state and the barrier moves from the first position toward the second position. The second state indicates the barrier has moved from the first position toward the second position. The container assembly can be configured such that, when released by the retainer, the indicator slides within the slot from the first state, toward the window, and to the second state such that the indicator is visible through the window. The barrier can include a first edge and a second edge opposite the first edge. The barrier can be attached to the frame along the first edge of the barrier and the container assembly can be configured such that the second edge is positioned above the first edge when the barrier is in the first position during use of the container assembly. Further, the container assembly can be configured such that the second edge is positioned at or below the first edge when the barrier is in the second position during use of the container assembly.

The slot can include a first slot segment extending away from the second edge toward the first edge and a second slot segment extending away from the second edge and toward the first edge, wherein the first slot segment and the second slot segment intersect at an angle ranging from 30° to 174°. The indicator can have a first visibility through the window when the indicator is in the first state and a second visibility through the window when the indicator is in the second state, wherein the first visibility is greater than the second visibility. In an implementation, the indicator is not visible through the window when the indicator is in the first state and the indicator is at least partially visible through the window when the indicator is in the second state.

When the indicator is in the second state, the indicator is configured to remain in the second state when the barrier moves to closed position and when the barrier is in the second position until the indicator is reset. The barrier can include a front panel including the window and a back panel, wherein the slot is positioned between the front panel and the back panel. The retainer can include a magnet and the indicator can include a magnetic material. In an implementation, the indicator can include an arm that at least partly defines a notch and the retainer can include a post attached to the frame. The indicator can hang by the arm from the post when the indicator is in the first state.

In another implementation, a stowage container includes a breach indicator, a housing defining a stowage area, a barrier movably attached to the housing such that the barrier moves between a first position and a second position, the barrier defining a slot and further defining a window that opens to the slot, an indicator slidably positioned within the slot, and a retainer attached to the housing. The retainer is configured to maintain the indicator in a first state within the slot when the barrier is in the first position and, when the barrier moves from the first position toward the second position, the indicator slides within the slot from the first state, toward the window, and to a second state such that the indicator is visible through the window.

The barrier can include a first edge and a second edge opposite the first edge, and the barrier can be attached to the housing along the first edge of the barrier. The stowage container can be configured such that the second edge is positioned above the first edge when the barrier is in the first position during use of the stowage container the second edge is positioned at or below the first edge when the barrier is in the second position during use of the stowage container. The slot can include a first slot segment extending away from the second edge toward the first edge and a second slot segment extending away from the second edge and toward the first edge, wherein the first slot segment and the second slot segment intersect at an angle ranging from 30° to 174°.

In an implementation, the indicator is not visible through the window when the indicator is in the first state and the indicator is at least partially visible through the window when the indicator is in the second state. When the indicator is in the second state, the indicator can be configured to remain in the second state when the barrier is in the first position and when the barrier is in the second position until the indicator is reset.

The barrier can include a front panel and a back panel attached to the front panel, wherein the slot is positioned between the front panel and the back panel. The front panel and the back panel can be opaque. The retainer can include a magnet, the indicator can include a magnetic material, and the retainer and the indicator can be configured such that the indicator is maintained in the first state using a magnetic force. The indicator can include an arm that at least partially defines a notch, the retainer can include a post attached to the housing, and the indicator can hang by the arm from the post when the indicator is in the first state. The stowage container can be attached to a seat of an aircraft and can include a life vest within the stowage area.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
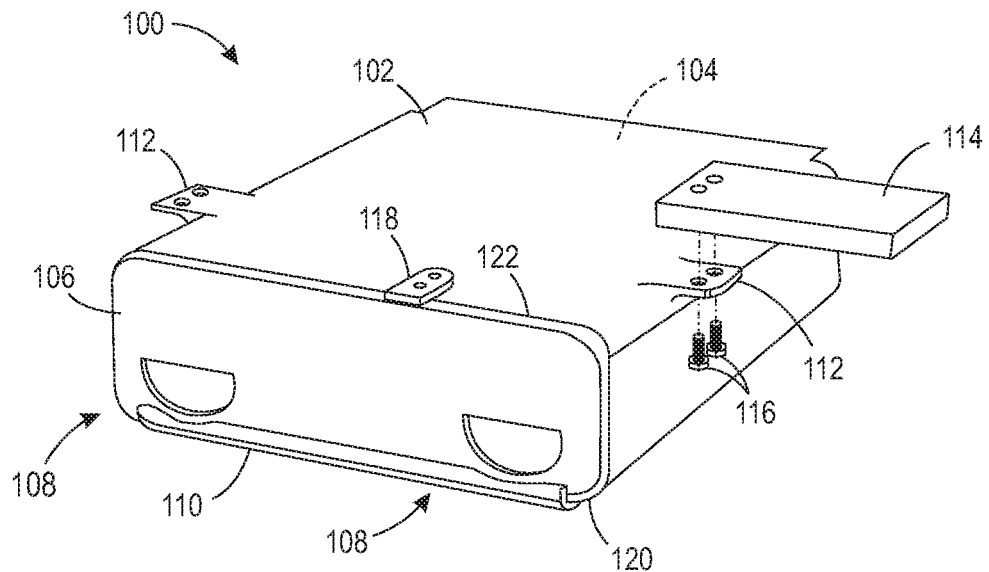
FIG. 1 is a perspective depiction of a stowage container according to an implementation of the present teachings in a closed and sealed condition.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

One or more implementations of the present teachings can result in a more rapid and simplified inspection of a stowage container to determine whether the stowage container has been breached or opened compared to some prior systems. In an implementation, if the stowage container is opened, an indicator assembly adjusts from a first state (e.g., an armed state, sealed state, closed state, etc.) that indicates that the stowage container is sealed, to a second state (e.g., an unarmed state, unsealed state, breached state, open state, etc.) that indicates the stowage container has been breached. It will be appreciated that the descriptive labels "first state" and "second state" are arbitrary and, alternatively, the first state can indicate an unarmed state, unsealed state, breached state, open state, etc., and the second state can indicate an armed state, sealed state, closed state, etc. The indicator assembly thus provides a visual identifier that conveys to an observer whether the stowage container is sealed or has been breached. When in the second state, for example, the indicator assembly remains in the second state upon closing the door. The indicator assembly can be reset from the second state to the first state by authorized personnel. The indicator assembly of the present teachings does not require a supply of replacement closures to be maintained and stored, thereby reducing inventory and ongoing costs.

Various aspects of the present teachings are discussed relative to a stowage container having a space for stowage of an item, where the stowage container is secured by a barrier such as a door. In one implementation, the stowage container is a life vest stowage container for an aircraft and the item is a life vest. It will be understood, however, that the present teachings can be applied to structures for use in fields other than aviation where detection of, or monitoring for, breach of a barrier other than a door, for example an access panel or other barrier that slides, pivots, rotates, or otherwise moves from a first position (e.g., closed or sealed) toward or into a second position (e.g., open, unsealed, or breached), is desired. Further, the present teachings can be applied to container structures and container assemblies other than stowage containers.

For purposes of the present teachings, an indicator assembly that forms a part of the stowage container can include various subassemblies such as an indicator (i.e., a wafer, chip, token, etc.), a slot defined by a barrier, and a retainer. The indicator is a part of the indicator assembly and provides a visual cue regarding whether the stowage container has been breached.

Figure 2:
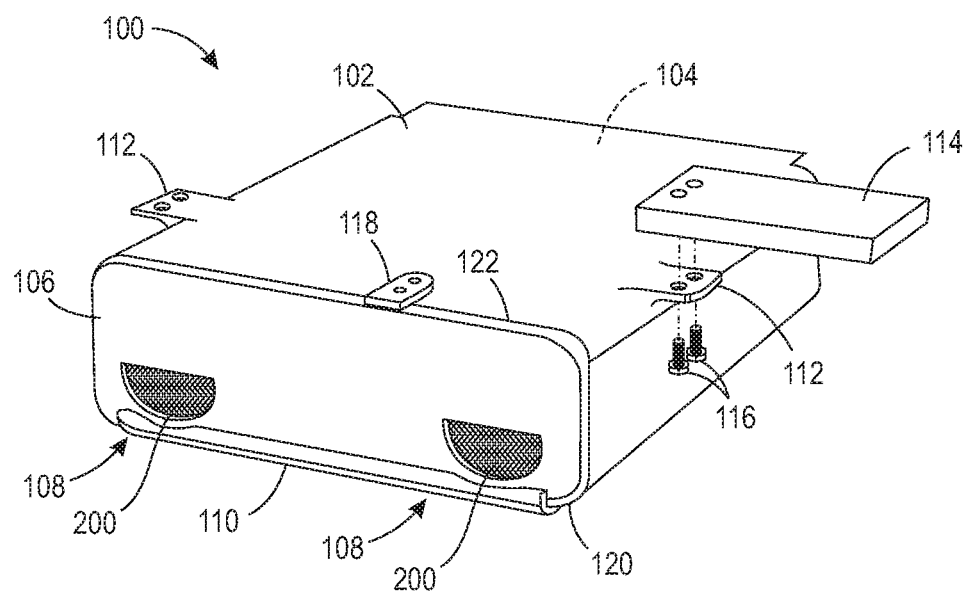
FIG. 2 is a perspective depiction of a stowage container according to the FIG. 1 implementation and in a closed and breached condition.
Figure 5:
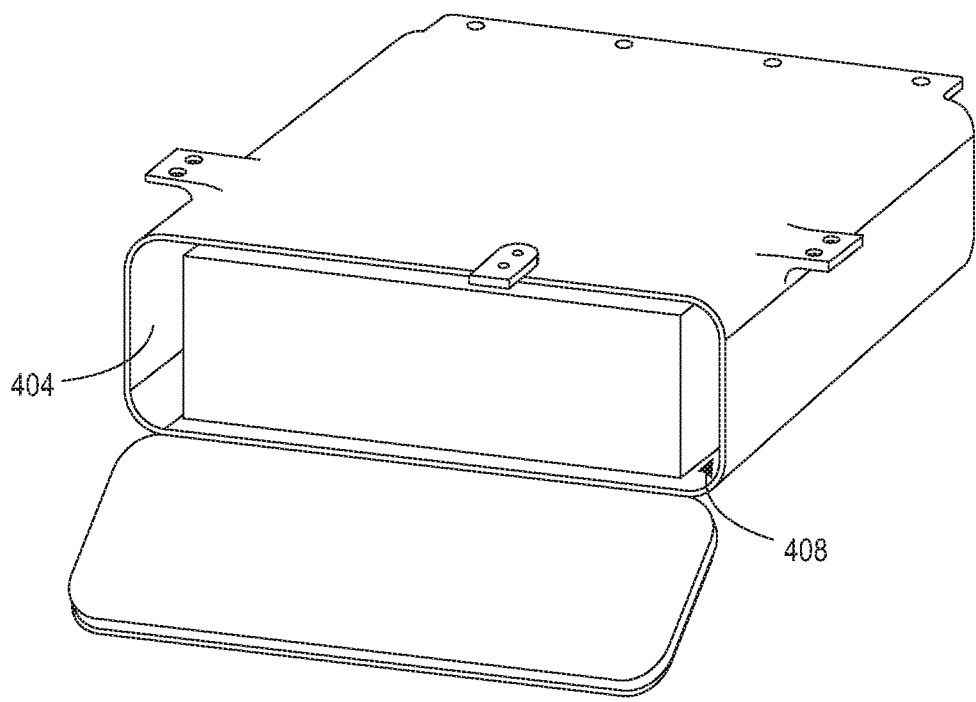
FIG. 5 is a perspective depiction of a stowage container in an open position according to an implementation of the present teachings.

FIGS. 1 and 2 are perspective depictions of a stowage container 100 according to an exemplary implementation of the present teachings. The stowage container 100 can include a frame or housing 102 that at least partially defines an internal stowage area or stowage compartment 104, a barrier 106 such as a door, a panel, etc., and at least one indicator assembly 108, where the indicator assembly 108 is at least partially defined by, and encased within, the barrier 106. Two separate indicator assemblies 108 are depicted in the figures for purposes illustration, and container assemblies with only one indicator assembly or more than two indicator assemblies, and/or more than one barrier 106, are contemplated. The barrier 106 can be attached to the housing 102 with a moveable joint 110 such as a hinge that allows the barrier 106 to move between a first position (for example, a sealed, locked, or closed position as depicted in FIG. 1) that does not permit access to the stowage compartment 104 into a second position (for example, an unsealed, unlocked, or open position as depicted in FIG. 5) that permits access to the stowage compartment 104. In the implementation of FIG. 1, the stowage container 100 includes tabs 112 for attachment to an underside 114 of a passenger seat using, for example, one or more fasteners 116 such as screws or bolts. The stowage container 100 can include other optional features such as a support 118 for releasably securing a device such as a radio frequency identification (RFID) device (not individually depicted for simplicity) to provide additional security measures. In addition, the stowage container 100 can include other structures or features that have not been depicted for simplicity, while various depicted structures and features can be removed or modified.

FIG. 1 depicts the indicator assembly 108 in a first state which, in this example, indicates that the stowage container 100 has not been breached. In the FIG. 1 depiction, the moveable joint 110 is positioned along, and attached to, a first edge 120 of the barrier 106 and the housing 102, wherein a second edge 122 of the barrier 106 is positioned above the first edge 120. The barrier 106 can be releasably held in the closed position using one or more known techniques, such as one or more springs, pins, internal or external latches, etc. Upon moving the barrier 106 from the closed position toward the open position, the second edge 122 can become positioned at or below a level of the first edge 120 to allow access into the interior of the stowage container 100. Further, when the barrier 106 moves from the closed position toward the open position, the indicator assembly 108 adjusts from the first state that indicates the barrier 106 of the stowage container 100 has not been breached or opened, to the second position as depicted in FIG. 2 that indicates the door of the stowage container 100 has been breached or opened. When the barrier 106 moves back toward, and into, to the closed position, the indicator assembly 108 remains in the second state as depicted in FIG. 2. In this implementation, in the second state of FIG. 2, one or more tokens, chips, wafers, or another indicator 200, which are not visible when the indicator assembly 108 is in the first state of FIG. 1, become visible in the second state of FIG. 2.

Various mechanical mechanisms configured to perform as described above are contemplated. For example, in the implementation of FIG. 3, the barrier 106 includes a front panel 300 defining or having an opening or window 302 therein, a back panel 304 (which may be visible through the window 302 when the indicator assembly 108 is in the first or sealed state), and a slot 306 between, and defined by, the front panel 300 and the back panel 304. In the FIG. 3 implementation, the stowage container 100 can also include a retainer (i.e., release mechanism or restrictor) 308 configured to position and/or maintain the indicator 200 in the first state such that the indicator 200 is not visible (or only minimally visible) through the window 302 in the front panel 300. Upon moving the barrier 106 from the closed position toward or into the open position, the retainer 308 releases the indicator 200, which moves, travels, rolls, drops, pivots, or otherwise traverses through the slot 306 to the opening 302, where the indicator 200 becomes visible (or more visible) from an exterior of the stowage container 100.

Figure 3:
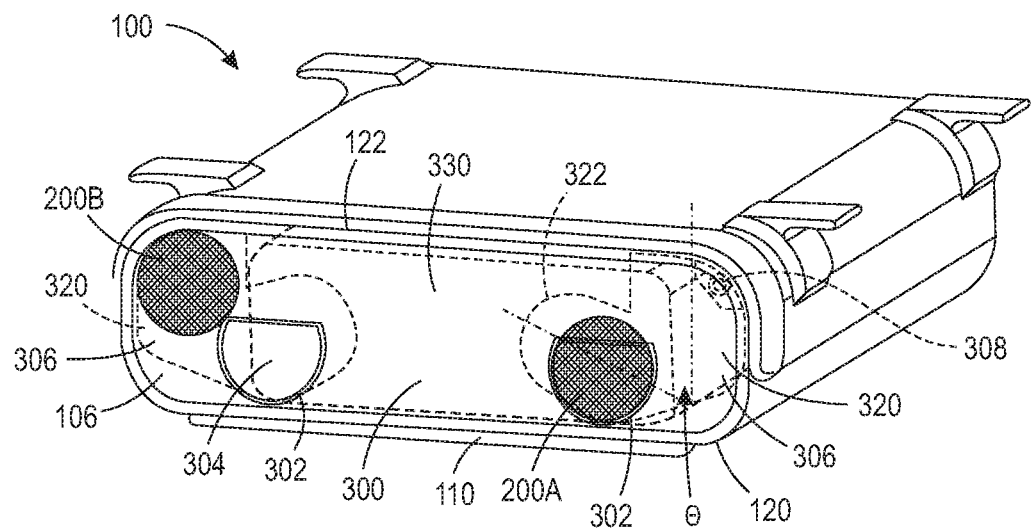
FIG. 3 is a semi-transparent perspective depiction of a stowage container according to an implementation of the present teachings.

In the FIG. 3 implementation, the indicator 200 is held in place using a magnetic force. For example, one of the retainer 308 and the indicator 200 (for example, the retainer 308) can be a magnet while the other of the retainer 308 and the indicator 200 (for example, the indicator 200) can be a magnetic or ferromagnetic material. The indicator 200 can be reset by an operator from the second state (indicator 200A of FIG. 3) to the first state (indicator 200B of FIG. 3) using, for example, a magnet to move the indicator 200 from the second state that indicates a breach to the first state that indicates the stowage container is sealed.

FIG. 3 depicts that the slot 306 includes a first slot segment 320 extending away from the second edge 122, away from the retainer 308, and toward the first edge 120. FIG. 3 further depicts that the slot 306 includes a second slot segment 322 extending away from the first edge 120 and toward the second edge 122. Including the second slot segment 322 can prevent the indicator 200 from being reset from the second state to the first state by slamming or otherwise manipulating the door from the open position to the closed position. When the second slot segment 322 is used, slamming the door results in the indicator 200 traveling into the second slot segment 322, then returning to the window 302. In an implementation, a line that bisects the first slot segment 320 can intersect a line that bisects the second slot segment 322 at an oblique angle "0" (FIG. 3) of from about 30° to about 174°, or from about 60° to about 140°. With angles outside of these ranges, the slot segments may not effectively prevent an unauthorized reset of the indicator assembly upon slamming or otherwise manipulating the barrier 106 from the open position to the closed position.

In an implementation, the first slot segment 320 can be designed or patterned to confound, impede, confuse, or otherwise make the resetting of the indicator assembly 108 more difficult or unintuitive without knowledge of the design of the stowage container. For example, the first slot segment 320 can be formed in an angled "S" pattern, or another pattern, and the indicator 200 can be a circular shape such that, upon opening the barrier 106, the circular indicator 200 is released from the retainer 308 and rolls along the slot 306 from the first state (e.g., in the position depicted by indicator 200B) to the second state (e.g., the position depicted by indicator 200A) under the influence of gravity. However, resetting the indicator 200 from the second state to the first state requires knowledge of the stowage container 100 design. The barrier 106 can be opaque, and thus the pattern of the slot 306 cannot be identified from either the exterior or the interior of the stowage container 100 from visual inspection. For purposes of illustration, FIG. 3 is a semi-transparent perspective depiction to depict the slots 306 and slot segments 320, 322, and further illustrates the item 330, such as a life vest 330, within the stowage container 100.

Figure 4:
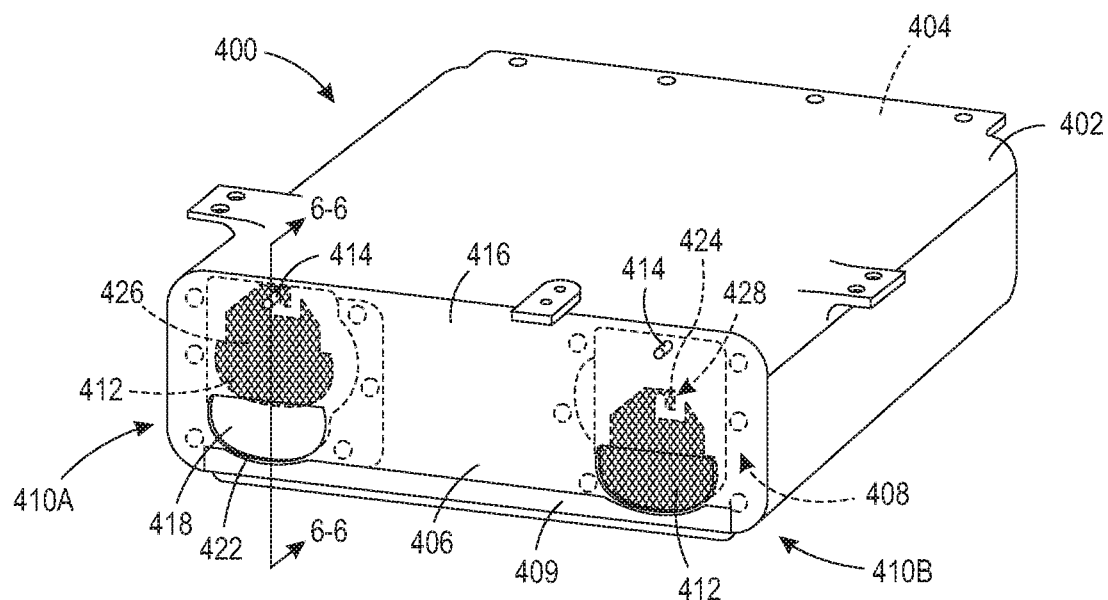
FIG. 4 is a semi-transparent perspective depiction of a stowage container according to another implementation of the present teachings.
Figure 6:
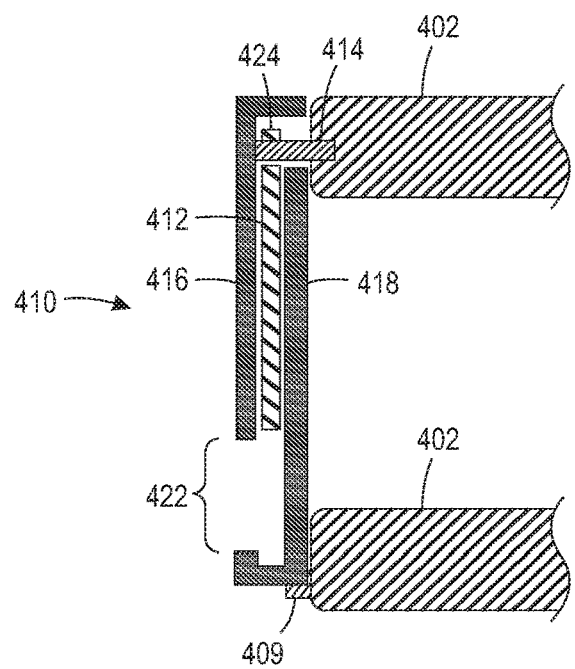
FIG. 6 is a cross section of an indicator assembly in a closed and sealed position according to an implementation of the present teachings.
Figure 7:
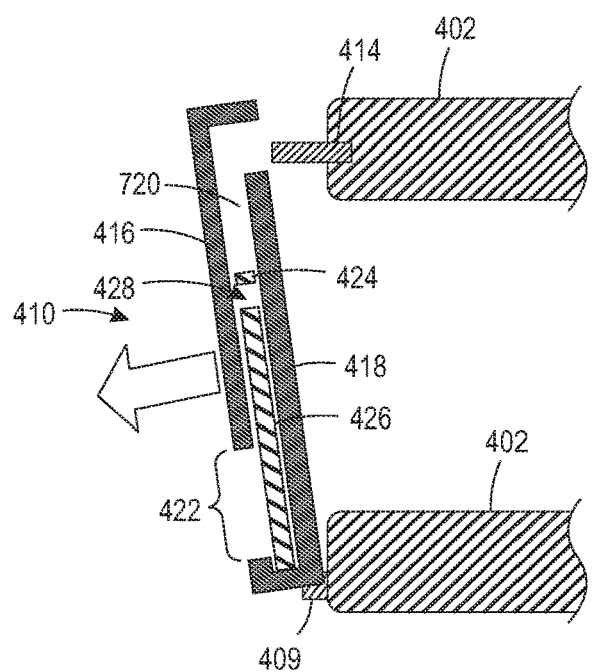
FIG. 7 is a cross section of the FIG. 6 implementation in a partially open and breached position.

Another example implementation of a stowage container 400 is depicted in the perspective views of FIGS. 4-7. FIGS. 4 and 6 depict the barrier of the stowage container 400 in a first position, such as a closed or sealed position, while FIGS. 5 and 7 depict the barrier of the stowage container 400 in a second position, such as an open or breached position. This example includes a frame or housing 402 that at least partially defines a stowage compartment 404, and a barrier 406 such as a door, a panel, etc., that, in a closed position, provides a barrier to an opening 408 of the stowage container 400 and thus to the stowage container 400 itself. The barrier 106 can be attached to the housing 402 using, for example, a moveable joint 409 such as a hinge. The stowage container 400 further includes at least one indicator assembly 410 such as a breach indicator assembly 410. FIGS. 4 and 5 depict two indicator assemblies 410, including indicator assembly 410A which is in the sealed state and indicator assembly 410B which is in the breached state.

As depicted in FIGS. 4-7, particularly in the cross section of FIG. 6 and the cross section of FIG. 7, each taken along 6-6 of FIG. 4, each indicator assembly 410 includes an indicator 412 and a post 414, where the post 414 is attached to, or formed as a part of, the housing 402. In this implementation, the post 414 provides at least a portion of a retainer configured to releasably hold the indicator 412 in the first state until the barrier 106 is moved toward the open position. The barrier 106 includes a front panel 416 and a back panel 418 that together define a slot 720 within the barrier 106. The front panel 416 can further define an opening or window 422, through which the back panel 418 may be visible when the indicator assembly 410 is in the first state (i.e., the sealed state) of FIG. 6 and through which the indicator 412 is visible when the indicator assembly 410 is in the second state (i.e., breached state) of FIG. 7. The indicator 412 includes a hook or arm 424 and a body 426, where the arm 424 extends from the body 426 and defines a notch 428.

When the stowage container 400 is in the closed position and the indicator assembly 410 is in the first state as depicted in FIGS. 4 and 6, the indicator 412 hangs by the arm 424 from the post 414. In the first state, the indicator 412 is held within an upper portion of the slot 720 and is not visible, or is only minimally visible, through the window 422, and the back panel 418 may be visible through the window 422. As the barrier 106 moves from the closed position of FIG. 6 toward the open position as depicted in FIG. 7, the indicator 412, which is held within the slot 720 by the front panel 416 and the back panel 418, slides off of the post 414 and drops down toward or to a bottom portion of the slot 720 as depicted in FIG. 7, where the indicator 412 is visible through the window 422 and the back panel 418 may not be visible through the window 422.

Once the indicator assembly 410 has been triggered from the first state of FIG. 6 to the second state of FIG. 7, closing the barrier 106 does not return the indicator assembly 410 to the first state, but rather the indicator assembly 410 remains in the second state and must be reset to the first state. In an implementation, the indicator 412 can be manufactured from a magnetic material.

While FIGS. 1-7 depict exemplary implementations for a stowage container such as a life vest stowage container with a breach detection and indication system, it will be appreciated that other implementations are contemplated. For example, an indicator assembly as described herein, or a similar indicator assembly, can be used with an access panel that slides vertically, laterally, or obliquely.

Figure 8:
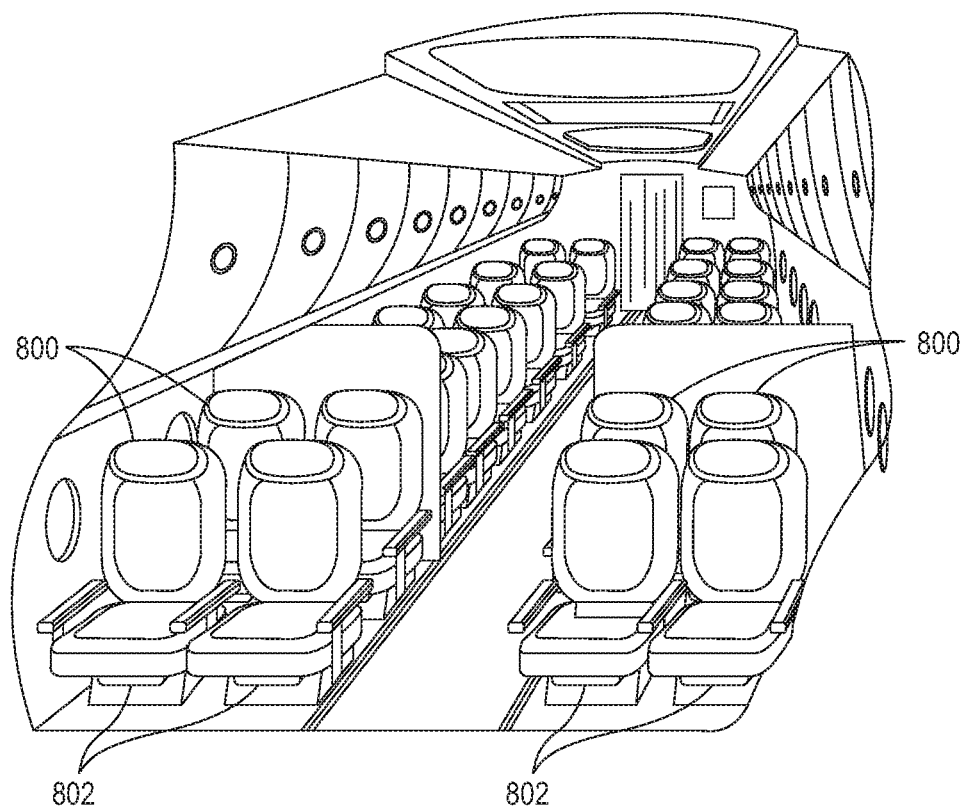
FIG. 8 is a perspective depiction of a row of seats each including an attached stowage container according to an implementation of the present teachings.
Figure 9:
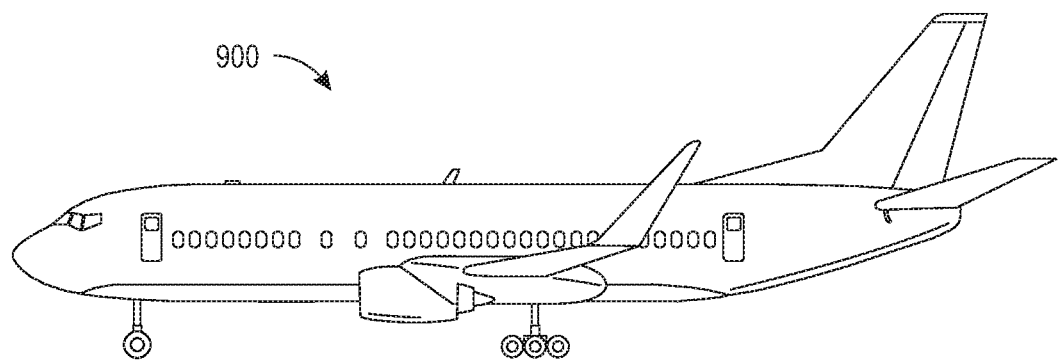
FIG. 9 is a side view of an aircraft that can include one or more seats, where each seat includes an attached stowage container according to an implementation of the present teachings.

FIG. 8 is a perspective depiction of a plurality of seats 800, with a separate stowage container 802 attached to an underside of each seat 800. Each stowage container 802 can include an item such as a life vest (e.g., 330 of FIG. 3) within a stowage compartment. The plurality of seats 800 can be included as part of a commercial or private aircraft 900 (FIG. 9) or another type of vehicle. Non-vehicle uses of a barrier having an indicator assembly as a breach detector in accordance with the present teachings are also contemplated.

Figure 10:
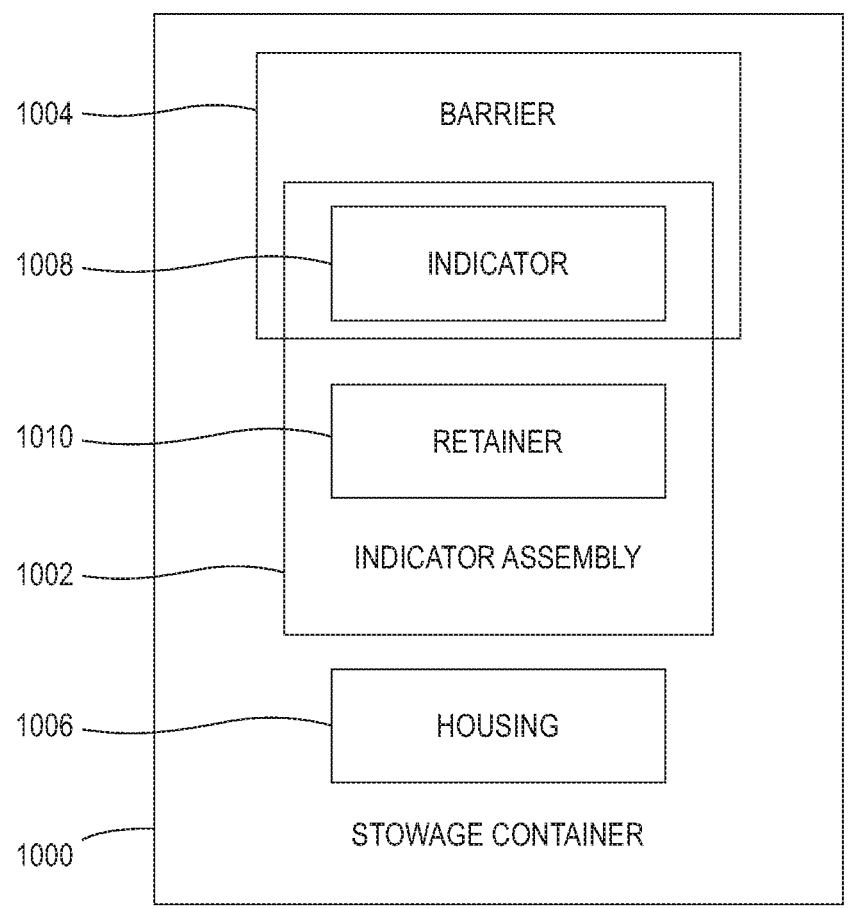
FIG. 10 is a functional block diagram of a stowage container including a barrier and an indicator assembly.

FIG. 10 is a functional block diagram of a stowage container 1000 according to an implementation of the present teachings. The stowage container 1000 includes an indicator assembly 1002, a barrier 1004, and a housing 1006. The housing 1006 defines an interior of the stowage container 1000 that can be used to stow a life vest or other article. The indicator assembly 1002 includes an indicator 1008 that can be positioned within the barrier 1004. The indicator assembly 1002 further includes a retainer 1010. When the indicator 1008 is in a first state (e.g., an armed state, sealed state, closed state, etc.) that indicates that the stowage container is sealed and the barrier 1004 is in a first position (e.g., closed), the retainer 1010 maintains the indicator 1008 in the first state. Upon moving the barrier 1004 toward a second position (e.g., open), the retainer 1010 releases the indicator 1008 to a second state (e.g., an unarmed state, unsealed state, breached state, open state, etc.) that indicates the stowage container 1000 has been breached. Upon returning the barrier 1004 to the first position, the indicator 1008 remains in the second state until reset, for example, manually reset, by authorized personnel.

Figure 11:
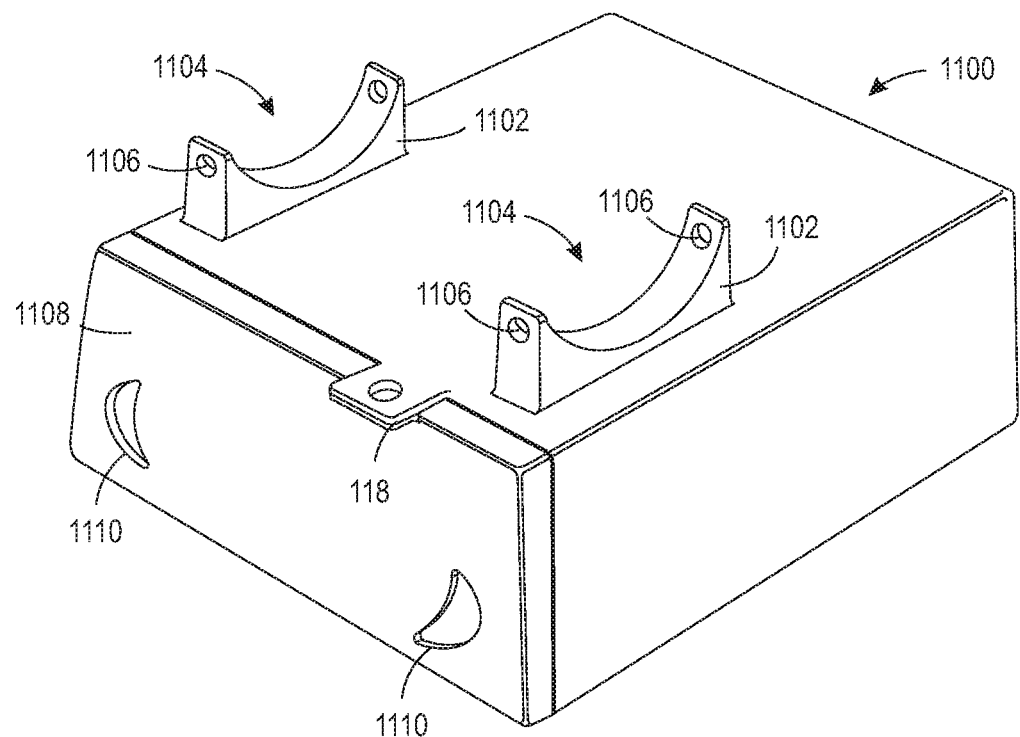
FIG. 11 is a perspective depiction of another implementation of a stowage container according to the present teachings.

Various implementations of the present teachings will become apparent to one of ordinary skill in the art. For example, while FIG. 1 depicts tabs 112 that can be used to connect the stowage container 100 to an underside 114 of a passenger seat, other attachments are contemplated. FIG. 11 depicts a stowage container 1100 including a pair of brackets 1102, with each bracket 1102 forming or defining a concave recess 1104. The brackets 1102 can be placed against, and attached to, a seat portion 2500 (FIG. 25) of a seat 2502 such as a passenger seat, for example, using one or more fasteners 2504 such as bolts, rivets, pins, or another fastener through one or more holes 1106 defined by the brackets 1102. Additionally, while FIG. 3 depicts the front panel 300 defining or having a window 302 of a particular shape (arcuate or semicircular), various other shapes are contemplated. The stowage container 1100 of FIG. 11 depicts a barrier 1108 defining or having a pair of crescent-shaped windows 1110. In FIG. 11, the crescent-shaped windows 1110 display mirror symmetry. The crescent shape of the windows 1110 may contrast with generally horizontal and vertical lines of adjacent structures and can improve detection of an indicator displayed within the window of a breached stowage container 1100.

Figure 12:
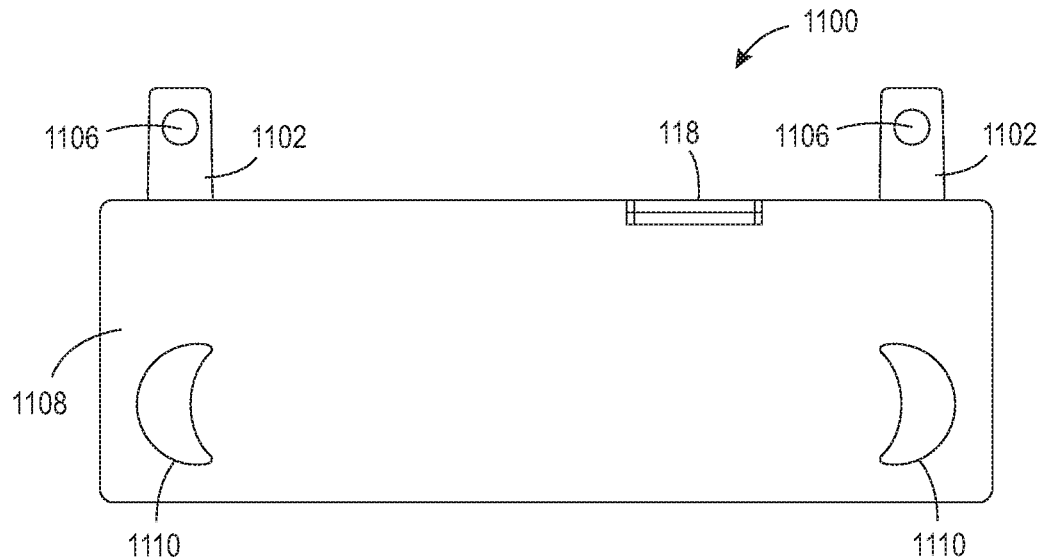
FIG. 12 is a front view of the FIG. 11 stowage container.

FIG. 12 depicts a front view of the stowage container 1100 of FIG. 11.

Figure 13:
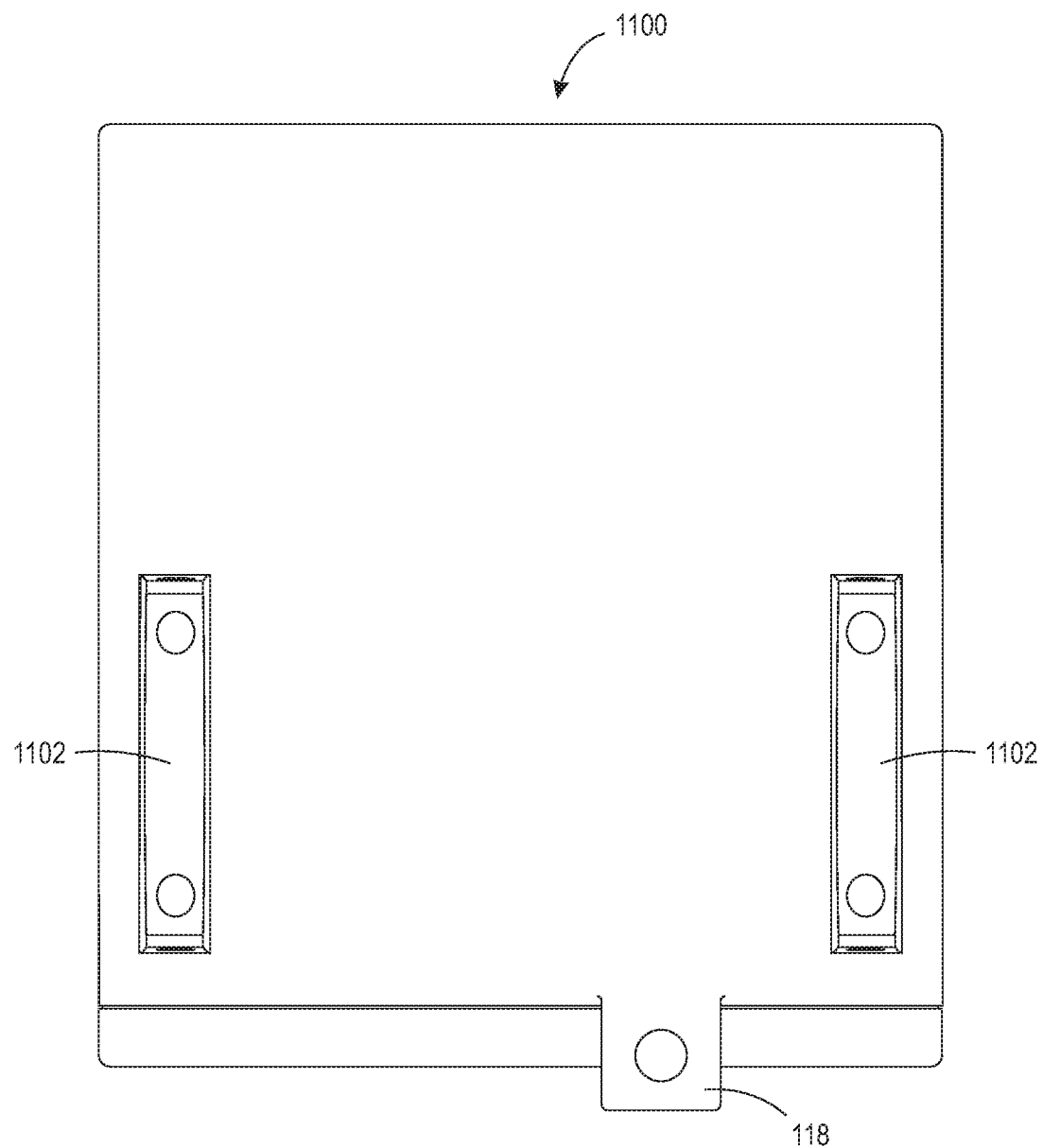
FIG. 13 is a top view of any of the stowage containers of FIG. 11, 19, 21, or 23.

FIG. 13 depicts a top view of the FIG. 11 stowage container 1100.

Figure 14:
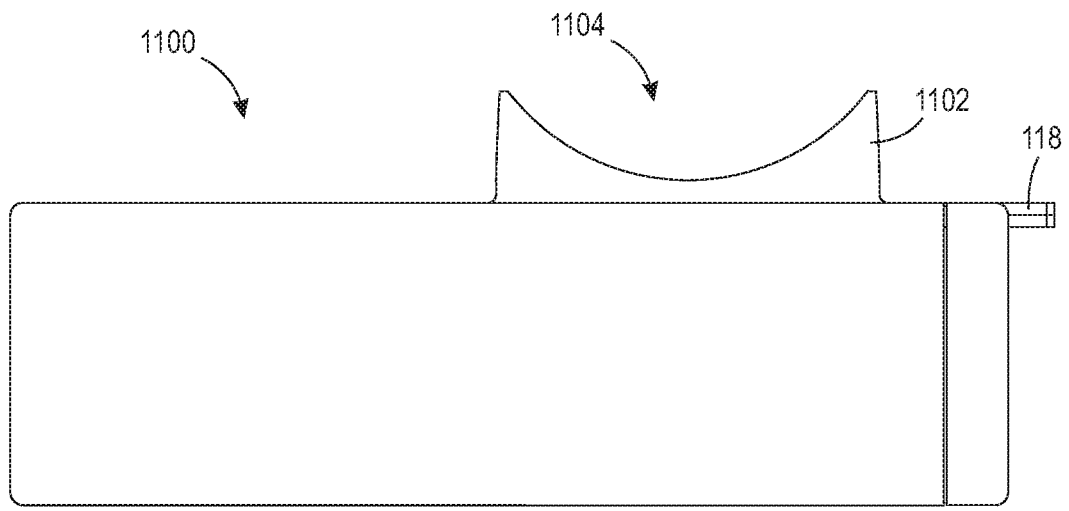
FIG. 14 is a right side view of any of the stowage containers of FIG. 11, 21, or 23.

FIG. 14 depicts a right side view of the FIG. 11 stowage container 1100.

Figure 15:
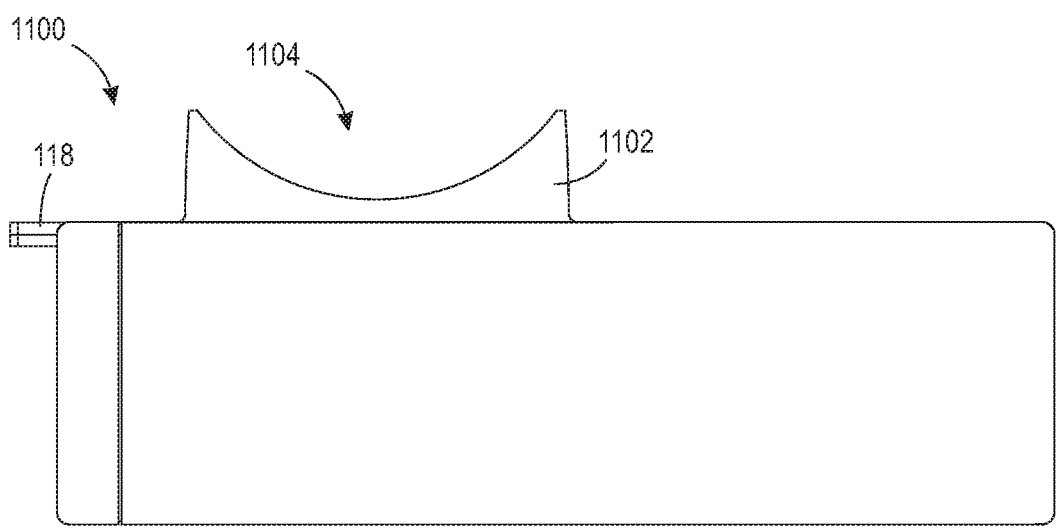
FIG. 15 is a left side view of any of the stowage containers of FIG. 11, 21, or 23.

FIG. 15 depicts a left side view of the FIG. 11 stowage container 1100.

Figure 16:
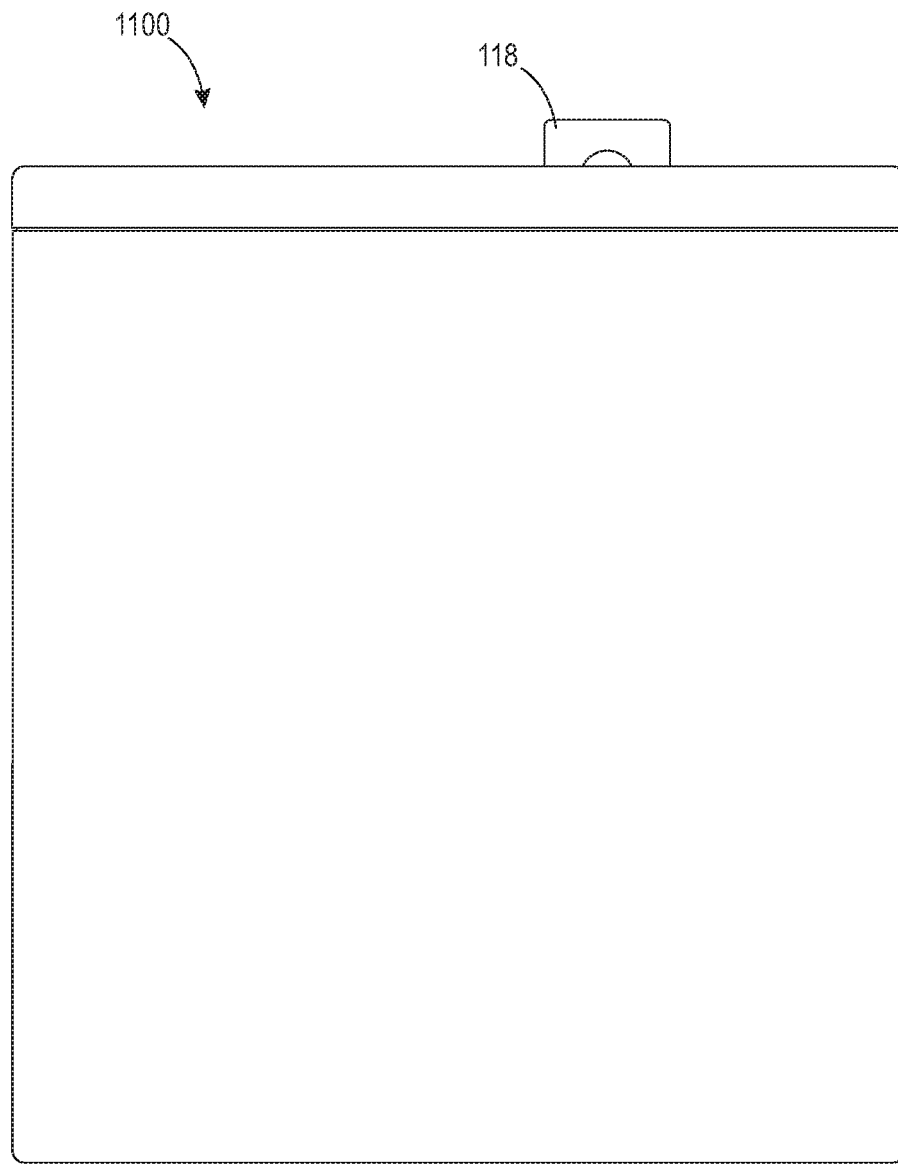
FIG. 16 is a bottom view of any of the stowage containers of FIG. 11, 19, or 23.

FIG. 16 depicts a bottom view of the FIG. 11 stowage container 1100.

Figure 17:
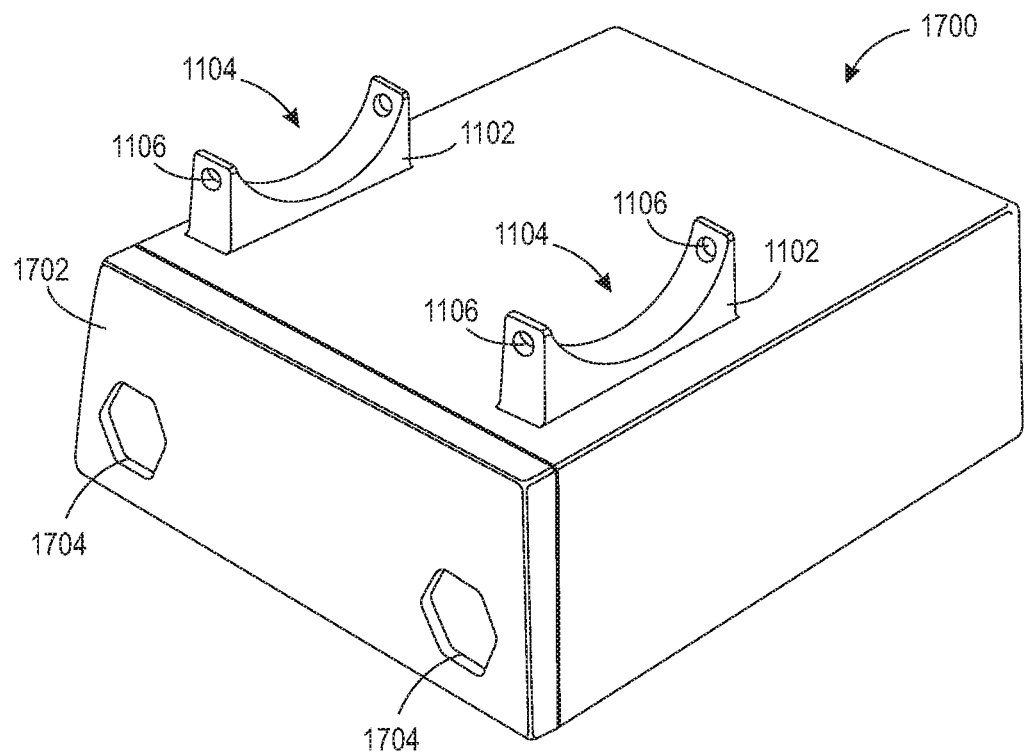
FIG. 17 is a perspective depiction of another implementation of a stowage container according to the present teachings.

FIG. 17 is a perspective depiction of a stowage container 1700 according to another implementation of the present teachings. The stowage container 1700 is manufactured without the optional support 118 that is described above for other implementations, although use of the optional support with the FIG. 17 implementation is contemplated. Further, a front panel 1702 of this implementation includes a pair of hexagonal windows 1704. The hexagonal shape and relatively large area of the windows 1704 may mitigate detection of an indicator displayed within the window of a breached stowage container 1700.

Figure 18:
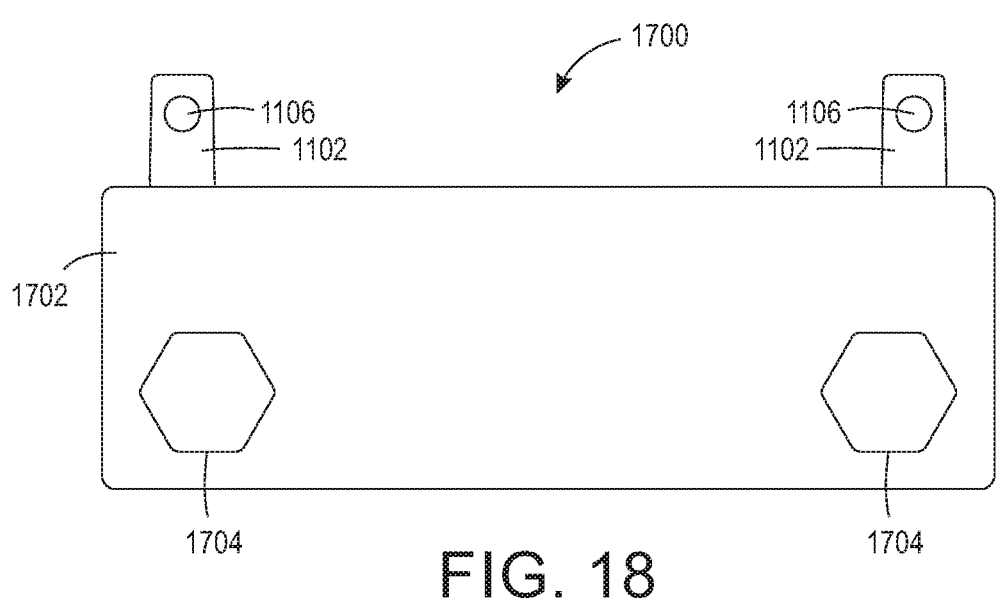
FIG. 18 is a front view of the FIG. 17 stowage container.

FIG. 18 is a front view depicting the stowage container 1700 of FIG. 17.

Figure 19:
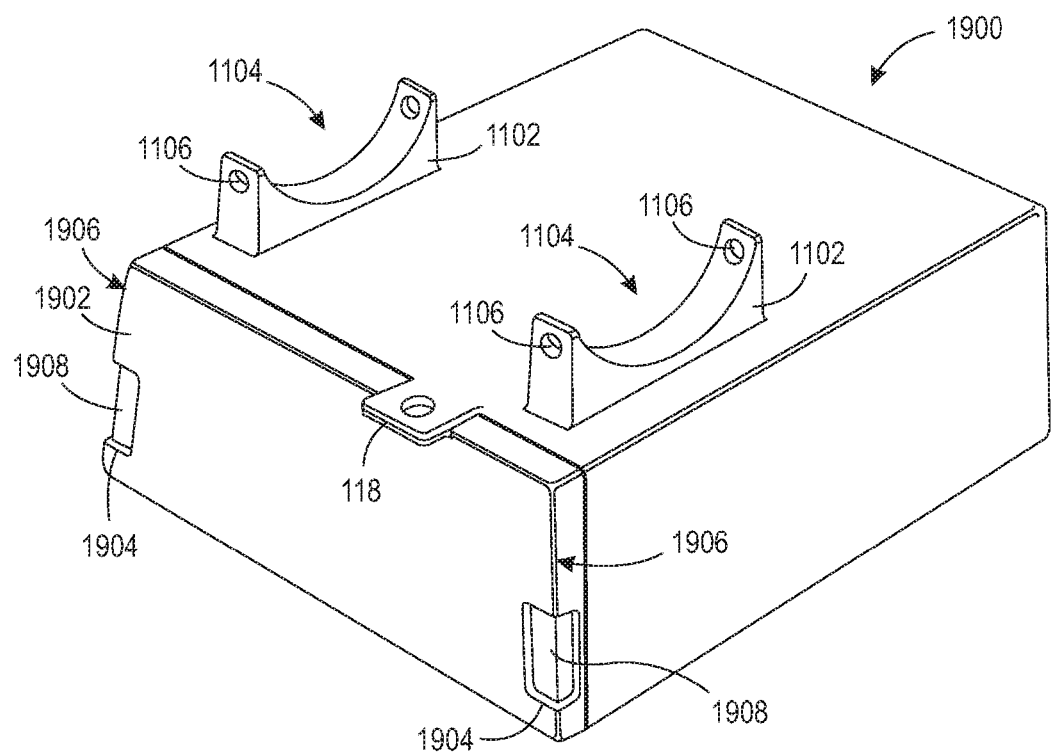
FIG. 19 is a perspective depiction of another implementation of a stowage container according to the present teachings.
Figure 20:
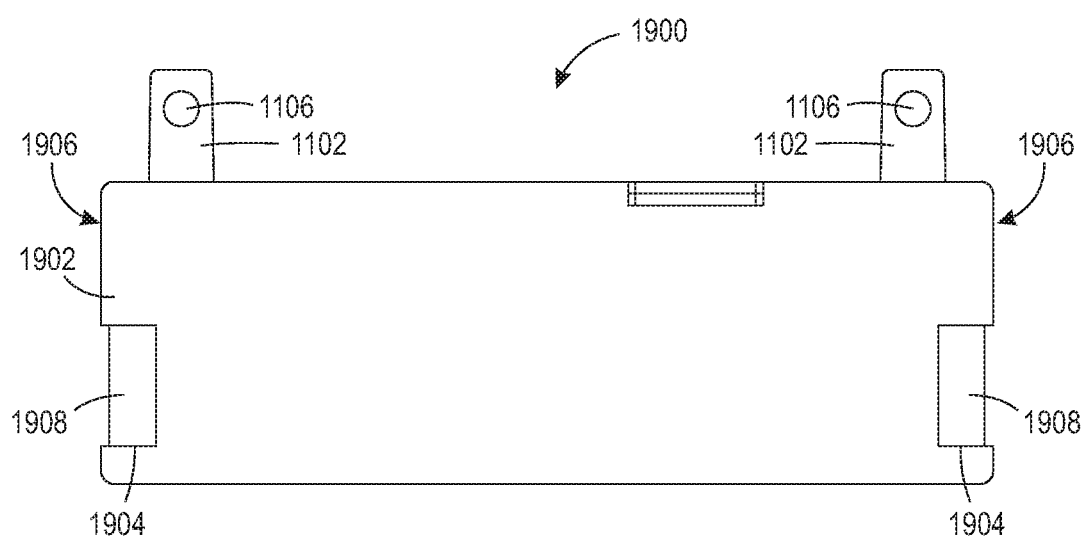
FIG. 20 is a front view of the FIG. 17 stowage container.

FIG. 19 is a perspective depiction of a stowage container 1900 according to another implementation of the present teachings. This implementation includes a barrier 1902 having a pair of windows 1904, where each window 1904 wraps around a vertically oriented edge 1906 of the barrier 1902 such that the at least one window 1904 is provided on three sides (i.e., a front side, a left side, and a right side) of the barrier 1902. When the stowage container 1900 is in a breached state, an indicator 1908 visible through the window 1904 can be seen from the front of the stowage container 1900 as depicted in the front view of FIG. 20, as well as from both the left side and the right side of the stowage container 1900, thereby increasing visibility and detection of the indicator 1908.

Figure 21:
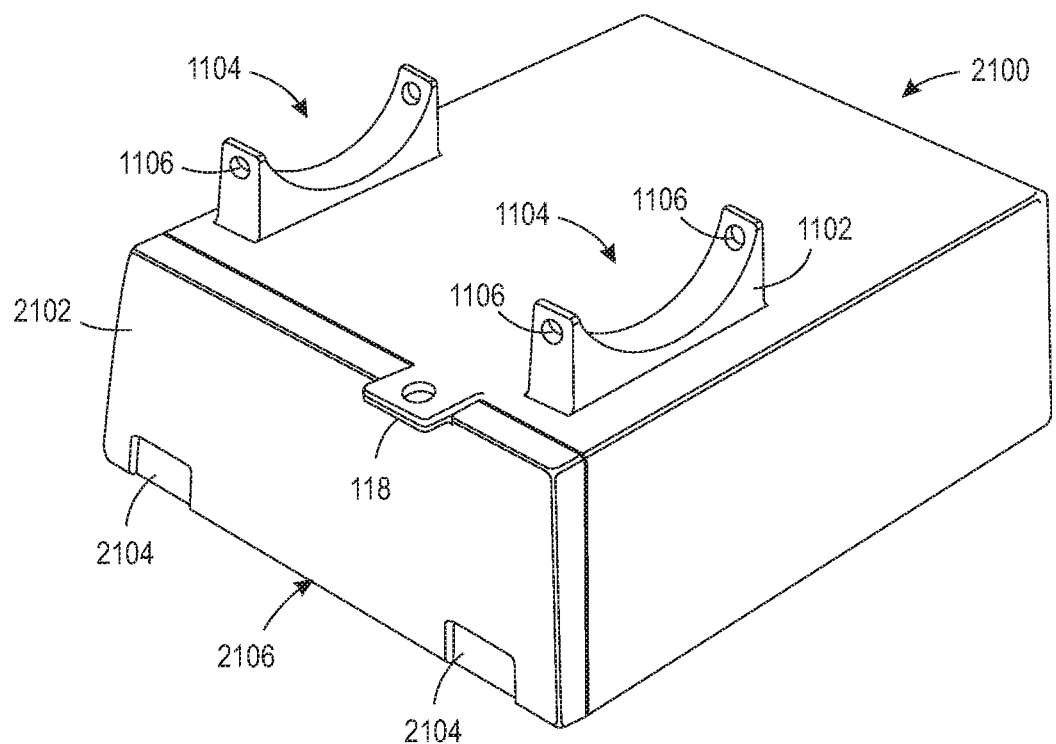
FIG. 21 is a perspective depiction of another implementation of a stowage container according to the present teachings.

FIG. 21 is a perspective depiction of a stowage container 2100 according to another implementation of the present teachings. This implementation includes a barrier 2102 having a pair of windows 2104, where each window 2104 is positioned at and/or near a bottom edge 2106 of the barrier 2102. When the stowage container 2100 is in a breached state, an indicator visible through the window 2104 can be seen from a higher vantage point relative to the stowage container 1900, for example, by an inspector standing in an aisle of an aircraft, compared to a window positioned higher on the barrier. Positioning the windows 2014 low on the barrier 2102 can reduce the necessity for an inspector to stoop or bend into a low position to view or inspect the window 2104.

Figure 22:
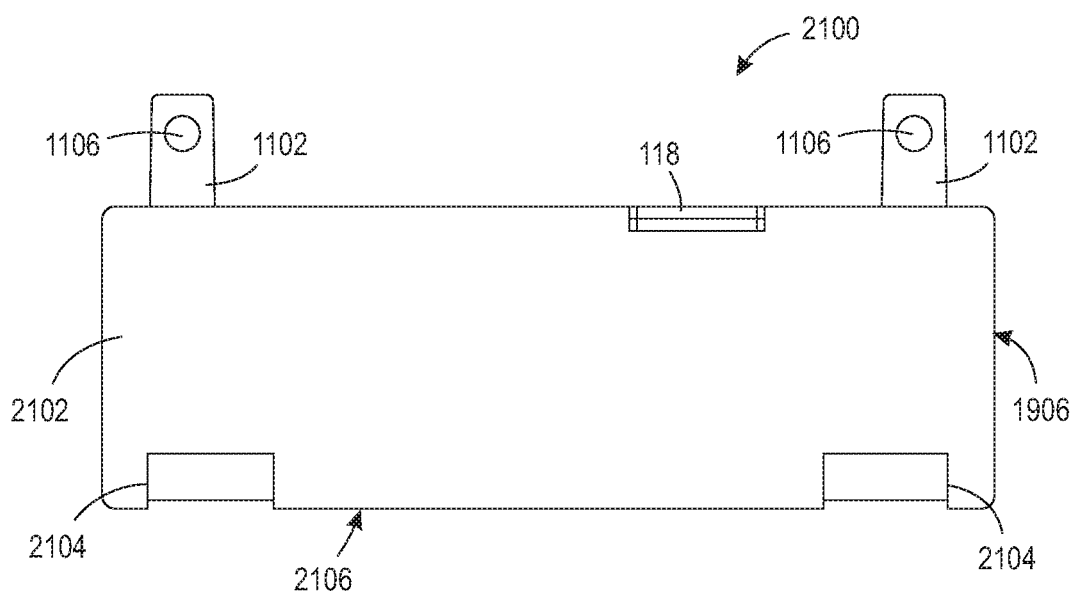
FIG. 22 is a front view of the FIG. 21 stowage container.

FIG. 22 is a front view depicting the stowage container 2100 of FIG. 21.

Figure 23:
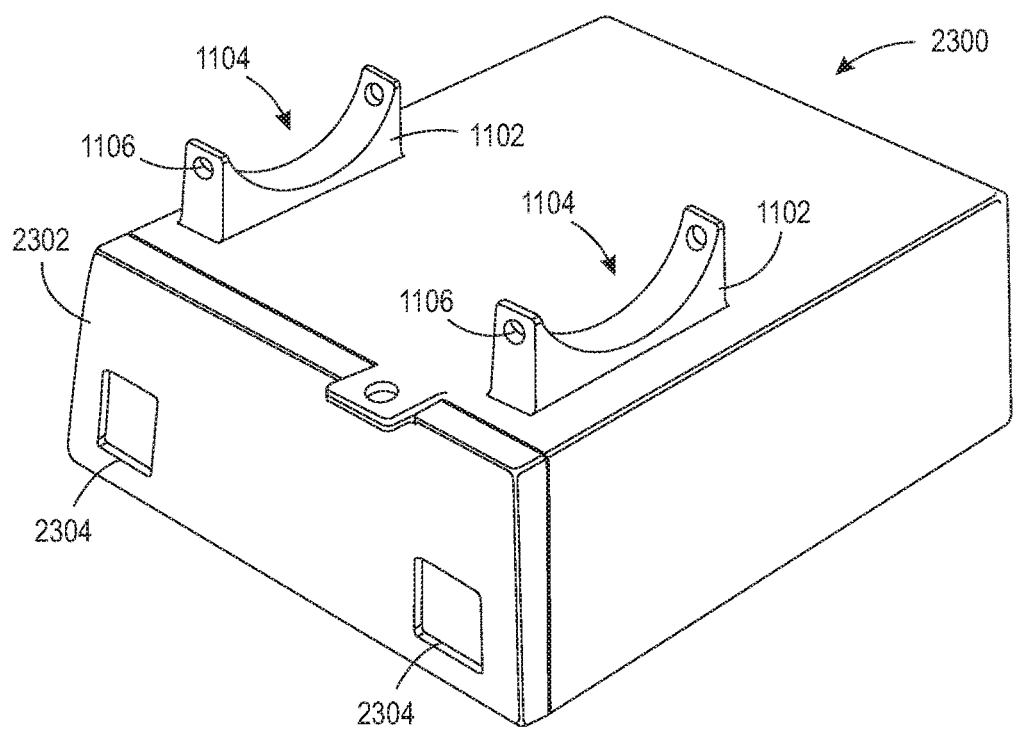
FIG. 23 is a perspective depiction of another implementation of a stowage container according to the present teachings.

FIG. 23 is a perspective depiction of a stowage container 2300 according to another implementation of the present teachings. A front panel 2302 of this implementation includes a pair of square windows 2304. The square shape and relatively large area of the windows 2304 may mitigate detection of an indicator displayed within the window of a breached stowage container 2300.

Figure 24:
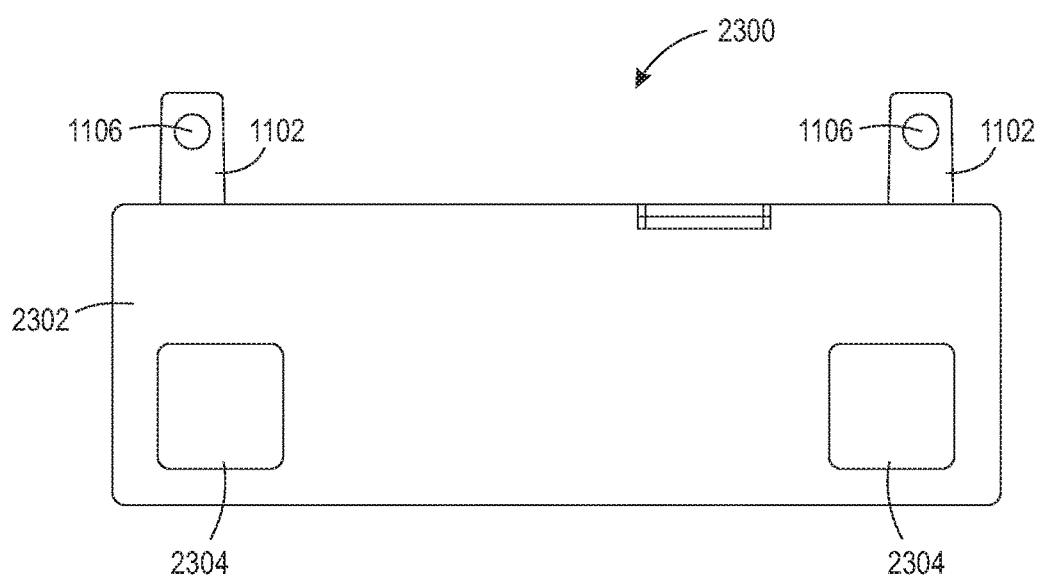
FIG. 24 is a front view of the FIG. 23 stowage container.

FIG. 24 is a front view depicting the stowage container 2300 of FIG. 23.

Figure 25:
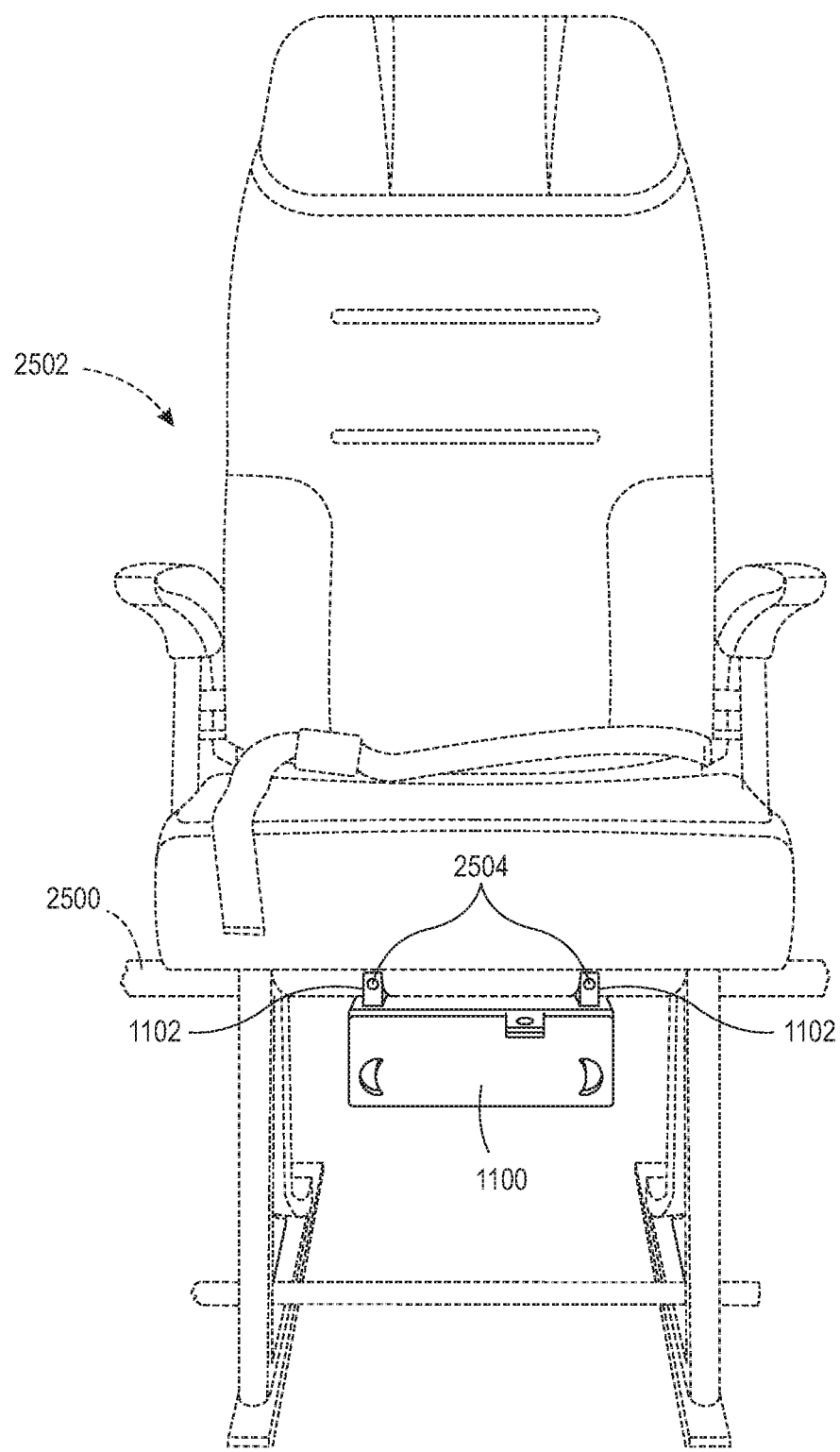
FIG. 25 is a front view of a stowage container according to an implementation of the present teachings, where the stowage container can be attached to another structure.

FIG. 25 is a front view of a passenger seat 2502 having a seat portion 2500 to which a stowage container 1100 in accordance with the present teachings is attached using one or more fasteners 2504 such as bolts, rivets, pins, or another fastener through one or more holes 1106 defined by the brackets 1102, or using another attachment scheme.

Figure 26:
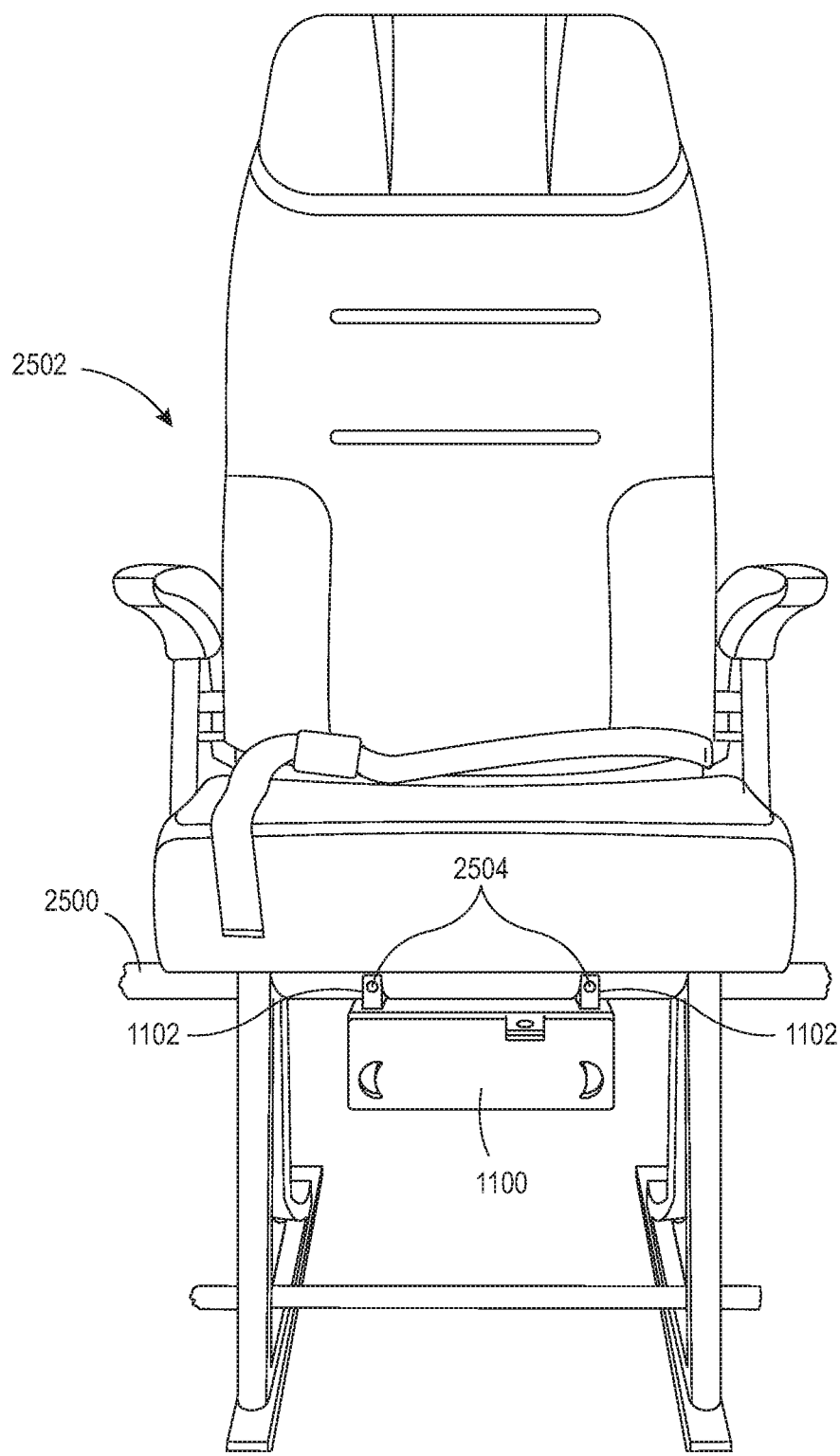
FIG. 26 is a front view of a seat such as a passenger seat and an attached stowage container in an installed environment according to an implementation of the present teachings.

FIG. 26 depicts a stowage container 1100 in an installed environment attached to an underside of a seat 2502 such as a passenger seat of an aircraft 900 (FIG. 9) or other transportation vehicle.

It will be appreciated that a top view of any of the stowage containers of FIG. 11, 19, 21, or 23 may appear similar to the top view of FIG. 13, a right side view of any of the stowage containers of FIG. 11, 21, or 23 may appear similar to the right side view of FIG. 14, a left side view of any of the stowage containers of FIG. 11, 21, or 23 may appear similar to the left side view of FIG. 15, and a bottom view of any of the stowage containers of FIG. 11, 17, 19, or 23 may appear similar to the bottom view of FIG. 16.

Various implementations of the present teachings thus provide an indicator assembly that monitors and indicates whether a barrier such as a door or panel has been breached. In a first or armed state, the indicator assembly indicates that the barrier has not been breached. Upon moving the barrier from a first position (such as a closed position) toward or to a second position (such as an open position), the indicator assembly adjusts from the first state to a second or unarmed state, which indicates that the barrier has been breached. Upon returning the barrier back to the closed position, the indicator assembly remains in the second state until the indicator assembly is reset by authorized personnel. The indicator assembly provides a device, gauge, indicium, or display which, upon visual inspection, indicates whether the barrier is in a sealed or unopened state, or in an unsealed, opened, or breached state. The indicium can be an indicator that has a first visibility when the barrier is in an unbreached state and a second visibility when the barrier is in a breached state, where the second visibility is greater than the first visibility. The indicator assembly is a mechanical device that requires no electrical power to operate.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts can occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein can be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed can be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A container assembly, comprising:
 a barrier defining a slot and a window that opens to the slot;
 a frame, wherein the barrier is movably attached to the frame such that the barrier moves between a first position and a second position;
 an indicator positioned within the slot; and
 a retainer attached to the frame, wherein:
  the retainer is configured to maintain the indicator in a first state within the slot when the barrier is in the first position;
  the indicator is not visible through the window when the indicator is in the first state;
  the indicator moves into a second state in response to the barrier moving from the first position toward the second position;
  the indicator is configured to be held in place in the first state, the second state, or both using a magentic force; and
  the indicator is at least partially visible through the window when the indicator is in the second state.

2. The container assembly of claim 1, wherein, when the indicator is released by the retainer, the indicator slides within the slot from the first state, toward the window, and to the second state such that the indicator is visible through the window.

3. The container assembly of claim 1, wherein:
 the barrier comprises a first edge and a second edge opposite the first edge;
 the barrier is attached to the frame along the first edge of the barrier;
 the second edge is positioned above the first edge when the barrier is in the first position; and
 the second edge is positioned at or below the first edge when the barrier is in the second position.

4. The container assembly of claim 3, wherein the slot comprises:
 a first slot segment extending away from the second edge toward the first edge; and
 a second slot segment extending away from the second edge and toward the first edge, wherein the first slot segment and the second slot segment intersect at an angle ranging from 30° to 174°.

5. The container assembly of claim 1, wherein:
 the indicator has a first visibility through the window when the indicator is in the first state; and
 the indicator has a second visibility through the window when the indicator is in the second state, wherein the first visibility is greater than the second visibility.

6. The container assembly of claim 1, wherein, when the indicator is in the second state, the indicator is configured to remain in the second state, regardless of whether the barrier is in the first position or the second position, until the indicator is reset from the second state to the first state by a user.

7. The container assembly of claim 1, wherein the barrier comprises:
 a front panel comprising the window; and
 a back panel, wherein the slot is positioned between the front panel and the back panel.

8. The container assembly of claim 1, wherein the retainer comprises a magnet, and the indicator comprises a magnetic material.

9. The container assembly of claim 1, wherein:
 the indicator comprises an arm that at least partly defines a notch;
 the retainer comprises a post attached to the frame; and
 the indicator hangs by the arm from the post when the indicator is in the first state.

10. A stowage container comprising a breach indicator, the stowage container further comprising:
 a housing defining a stowage area, wherein the housing is attached to a seat of an aircraft;
 a barrier movably attached to the housing such that the barrier moves between a first position and a second position, the barrier defining a slot and a window that opens to the slot;
 an indicator positioned within the slot; and
 a retainer attached to the housing, wherein:
  the retainer is configured to maintain the indicator in a first state within the slot when the barrier is in the first position;

the retainer is further configured such that, when the barrier moves from the first position toward the second position, the indicator slides within the slot from the first state, toward the window, and to a second state such that the indicator is visible through the window; and the indicator is configured to remain in the second state, regardless of whether the barrier is in the first position or the second position, until the indicator is reset from the second state to the first state by a user.

11. The stowage container of claim 10, wherein:
the barrier comprises a first edge and a second edge opposite the first edge;
the barrier is attached to the housing along the first edge;
the second edge is positioned above the first edge when the barrier is in the first position;
the second edge is positioned at or below the first edge when the barrier is in the second position; and
the slot comprises:
  a first slot segment extending away from the second edge toward the first edge; and
  a second slot segment extending away from the second edge and toward the first edge, wherein the first slot segment and the second slot segment intersect at an angle ranging from 30° to 174°.

12. The stowage container of claim 10, wherein:
the indicator is not visible through the window when the indicator is in the first state; and
the indicator is at least partially visible through the window when the indicator is in the second state.

13. The stowage container of claim 10, wherein the barrier comprises:
a front panel; and
a back panel attached to the front panel, wherein the slot is positioned between the front panel and the back panel.

14. The stowage container of claim 13, wherein the front panel and the back panel are opaque.

15. The stowage container of claim 10, wherein:
the retainer comprises a magnet;
the indicator comprises a magnetic material; and
the retainer and the indicator are configured such that the indicator is maintained in the first state using a magnetic force.

16. The stowage container of claim 10, wherein:
the indicator comprises an arm that at least partially defines a notch;
the retainer comprises a post attached to the housing; and
the indicator hangs by the arm from the post when the indicator is in the first state.

17. The stowage container of claim 10, further comprising a life vest within the stowage area.

18. A container assembly, comprising:
a barrier defining a slot and a window that opens to the slot;
a frame, wherein the barrier is movably attached to the frame such that the barrier moves between a first position and a second position;
an indicator positioned within the slot; and
a retainer attached to the frame, wherein:
  one of the retainer and the indicator comprises a magnet;
  the other of the retainer and the indicator comprises a magnetic material;
  the retainer is configured to maintain the indicator in a first state within the slot when the barrier is in the first position due to a magnetic force between the magnet and the magnetic material; and
  the indicator moves into a second state in response to the barrier moving from the first position toward the second position.

19. The container assembly of claim 18, wherein:
the indicator is not visible through the window when the indicator is in the first state; and
the indicator is at least partially visible through the window when the indicator is in the second state.

* * * * *

UNITED STATES PATENT AND TRADEMARK OFFICE
CERTIFICATE OF CORRECTION

PATENT NO. : 10,577,063 B2
APPLICATION NO. : 15/701997
DATED : March 3, 2020
INVENTOR(S) : James Schalla Page 1 of 1

It is certified that error appears in the above-identified patent and that said Letters Patent is hereby corrected as shown below:

In the Claims

Column 12, Line 2, Claim 1, delete "magentic", and insert therefor --magnetic--.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*